United States Patent [19]

Hudson, Jr.

[11] 3,985,861

[45] Oct. 12, 1976

[54] PROCESS FOR REMOVING SULFUR COMPOUNDS FROM CLAUS OFF-GASES

[75] Inventor: Henry C. Hudson, Jr., Pasadena, Tex.

[73] Assignee: Shell Oil Company, Houston, Tex.

[22] Filed: Sept. 16, 1974

[21] Appl. No.: 506,377

[52] U.S. Cl. .............................. 423/244; 423/570; 423/573 R
[51] Int. Cl.$^2$ ..................... C01B 17/00; B01J 8/00; C01B 17/02
[58] Field of Search ........................ 423/242–244, 423/573 G, 574 G, 574 L, 576, 570

[56] References Cited
UNITED STATES PATENTS

| | | | |
|---|---|---|---|
| 3,026,184 | 3/1962 | Karasek | 423/573 |
| 3,752,877 | 8/1973 | Beavon | 423/244 |
| 3,764,665 | 10/1973 | Groenendaal et al. | 423/574 |
| 3,854,884 | 12/1974 | Robison | 423/574 |

FOREIGN PATENTS OR APPLICATIONS

| | | | |
|---|---|---|---|
| 1,145,043 | 3/1969 | United Kingdom | 423/574 |

Primary Examiner—Oscar R. Vertiz
Assistant Examiner—Gregory A. Heller

[57] ABSTRACT

An improvement on a process for decreasing the total sulfur content of off-gases from a Claus process is described wherein the sulfur dioxide-containing off-gas is mixed with a reducing gas and passed over a metallic reduction catalyst at elevated temperature to reduce the sulfur dioxide and other convertible sulfur compounds present to hydrogen sulfide followed by cooling of the thusly reduced gas stream at least partially by direct cooling with an aqueous quench liquid and removal of the hydrogen sulfide from the cooled gaseous stream by adsorption on an absorbent or absorbent for hydrogen sulfide, in which process the flow of either or both of the sulfur dioxide containing off-gas and the reducing gas to catalytic reduction is controlled by monitoring the sulfur dioxide content of the reduced gas stream. The improvement comprises monitoring the sulfur dioxide content of the reduced gas stream by subjecting a portion of the liquid quench streams utilized to cool the hydrogen sulfide-containing gas stream from catalyst reduction to stripping with an inert gas thereby substantially removing the hydrogen sulfide and carbon dioxide contained in said quench liquid and measuring the pH of the stripped quench liquid.

12 Claims, 2 Drawing Figures

PROCESS FOR REMOVING SULFUR COMPOUNDS FROM CLAUS OFF-GASES

BACKGROUND OF THE INVENTION

The invention relates to an improved process for reducing the total sulfur content of Claus off-gases.

In a typical Claus process elemental sulfur is manufactured from hydrogen sulfide by partial oxidation of the hydrogen sulfide to sulfur dioxide with oxygen or an oxygen-containing gas such as air, followed by reaction of the sulfur dioxide formed with the remaining part of the hydrogen sulfide in the presence of a catalyst. This process is commonly used both at refineries and for working-up hydrogen sulfide recovered from natural gas. It is generally carried out in a plant comprising a combustion chamber followed by one or more catalyst beds having condensers arranged in between in which the reaction products are cooled and the separated liquid sulfur recovered. The various steps of the process can be represented by the following equations:

$$2H_2S + 3O_2 \rightarrow 2H_2O + 2SO_2 \tag{1}$$

$$4H_2S + 2SO_2 \rightleftarrows 4H_2O + \frac{1}{x}S_x \tag{2}$$

while the total reaction is represented by equation (3):

$$6H_2S + 3O_2 \rightleftarrows 6H_2O + \frac{6}{x}S_x. \tag{3}$$

For temperatures below 500° C, $x$ in the above equation has a value of 8.

In actual practice, the yield of recovered elemental sulfur is not completely quantitative resulting in a certain quantity of unreacted hydrogen sulfide and sulfur dioxide remaining in the effluent gases from the Claus process. These gases which emanate from the Claus process at temperatures typically in the 150° C range are normally burned in an incinerator whereby the hydrogen sulfide is converted to sulfur dioxide which is subsequently discharged to the atmosphere through a stack. The quantity of sulfur recovered depends to a large extent on the total number of catalyst beds used in the Claus process. When three beds are used generally about 98% of the sulfur can be recovered.

Because of increasingly stringent limitations on sulfur emissions to the atmosphere, and to increase sulfur yields, a considerable amount of effort has been devoted recently to reducing the sulfur content of Claus plant off-gases. Among the more desirable processes developed for this purpose are those based on the catalytic reduction of the sulfur oxides contained in the off-gases to hydrogen sulfide which is subsequently removed with the use of a solid adsorbent or liquid absorbent for hydrogen sulfide. Generally, the reduction of the off-gases is effected by mixing the gases with a hydrogen and/or carbon monoxide-containing reducing gas in the presence of a metal catalyst at elevated temperatures, e.g., above 175° C. Such catalytic hydrogenation processes are described, for example, in co-assigned U.S. application Ser. No. 326,916 filed Jan. 26, 1973 and in U.S. Pat. No. 3,752,877 to Beavon. After catalytic reduction according to the referenced processes, the hydrogen sulfide-containing gaseous product of reduction is typically subject to a combination of cooling by indirect heat exchange and direct cooling by contact with an aqueous based quench liquid prior to removal and recovery of the $H_2S$ as sulfur, e.g., Stretford process, or directly as $H_2S$, e.g., selective alkanolamine adsorption.

While processes based on catalytic reduction of Claus off-gases and removal of the $H_2S$ so formed have achieved a large degree of commercial success such processes are not devoid of problems. For instance, problems may arise if complete reduction of sulfur compounds present in the Claus off-gas does not take place and if, for example, $SO_2$ is still present therein which through reaction with $H_2S$ may give rise to the formation of sulfur at undesirable locations which, in turn, may interfere with the conversion process of $H_2S$ to sulfur, for example, in that it reacts with the absorption and/or reaction liquids to be used. Incomplete reduction of the sulfur compounds may, for example, occur if less than the required amount of reducing gas is added for the catalytic reduction. This may be the result of an interruption in the supply and/or production of the reducing gas in question.

Further the quantities of sulfur compounds, in particular $SO_2$, in Claus off-gases may vary during operation, for example as the result of too large an air supply to the combustion chamber of the Claus plant, or of aging of the catalysts in the Claus catalyst beds. This change in Claus off-gas composition in the direction of higher $SO_2$ concentrations without a compensating increase in the quantity of reducing gas employed could also result in incomplete reduction and undesirable carry over of $SO_2$ into the absorption stage of the aforementioned processes.

In recognition of this potential problem source, it has been proposed in Netherlands patent application No. 7,310,929 to indirectly measure the $SO_2$ which may carry through the reduction step and adjust the reducing gas supply accordingly, by measuring the amounts of hydrogen present in the reduced gas before or after cooling using conductometric methods. An alternative method of determining $SO_2$ carry-through indirectly is also described in this Netherlands patent application which involves measurement of the amount of elemental sulfur (formed by the reaction of excess $SO_2$ and $H_2S$) in the aqueous quench liquid used for direct cooling. With this alternative method the sulfur content is determined by measuring the turbidity of the sulfur containing quench liquid. However, either or both of the above-mentioned methods for determining $SO_2$ breakthrough from the catalytic reduction step suffer from the disadvantages that the $SO_2$ measurement is indirect, somewhat complex analytical equipment and/or techniques are involved and the time required to obtain meaningful values on the amounts of $SO_2$ present is undesirably long.

Accordingly, it would be advantageous if a procedure could be devised wherein $SO_2$ breakthrough from the catalytic reduction step could be measured directly and rapidly with simplistic analytical equipment. Incorporation of such a procedure for monitoring $SO_2$ coupled with an appropriate control system on the feed streams into the hereinbefore described processes for reducing the total sulfur content of Claus off-gases would substantially reduce the problems associated with carry through of $SO_2$ from the catalytic reduction step into subsequent stages of the processes.

SUMMARY OF THE INVENTION

It has now been found that pH measurement of the aqueous based liquid quench liquid employed to at least partially cool the $H_2S$-containing gaseous streams from catalytic reduction in the above-described processes can be used as a sensitive and reliable means of ascertaining $SO_2$ breakthrough from catalytic reduction, if the quench liquid is first subject to stripping with an inert gas, e.g., nitrogen, to substantially remove the absorbed $CO_2$ and $H_2S$ prior to measurement of the pH. This finding is based on recognition of the fact that the sensitivity of $SO_2$ detection by pH measurement is greatly reduced by the presence of $CO_2$ and $H_2S$, in amounts commonly encountered in the aqueous based liquid used to partially cool the hot gaseous reduction product by direct quench, in combination with the discovery that a sufficient difference exists in the relative rates at which both $CO_2$ and $H_2S$ are removed from the aqueous quench liquid by the stripping action of an inert gas, as compared to the rate at which $SO_2$ is removed, such that substantial removal of both $CO_2$ and $H_2S$ is attainable in a sufficiently short time interval to allow responsive control of the process and minimization of damage associated with $SO_2$ breakthrough from the reduction step.

Accordingly, the instant invention provides an improved process for decreasing the total sulfur content of off-gases from a Claus process wherein the $SO_2$-containing off-gases are mixed with a hydrogen and/or carbon monoxide containing reducing gas and passed at a temperature in excess of about 175° C over a sulfided Group VI/Group VIII metal catalyst supported on an inorganic oxidic carrier to reduce the $SO_2$ and other convertible sulfur compounds to $H_2S$ followed by cooling of the $H_2S$-containing gaseous stream at least partially by direct cooling with a water-containing liquid quench stream and removal of the $H_2S$ from the cooled gaseous stream by adsorption on an absorbent or adsorbent for $H_2S$, in which process the flow of either or both of the $SO_2$ containing off-gases and the reducing gas over the metal catalyst is controlled by monitoring the $SO_2$ content of the reduced gas stream. This improved process is characterized by the improvement which comprises monitoring the $SO_2$ content of the catalytically reduced gas stream by subjecting a portion of the water-containing liquid quench stream employed to cool the $H_2S$-containing gas stream to stripping with an inert gas thereby substantially removing the $H_2S$ and $CO_2$ contained in said quench liquid and measuring the pH of the stripped quench liquid. Preferably the $SO_2$ monitoring is carried out on a continuous basis by continuously withdrawing a portion of the quench liquid, stripping with an inert gas and measuring the pH of the stripped liquid with a continuous pH analyzer, e.g., a probe type pH meter.

THE DRAWING

The invention will be described in greater detail with reference to the accompanying drawings.

DESCRIPTION OF THE PREFERRED EMBODIMENTS

Figure 1:
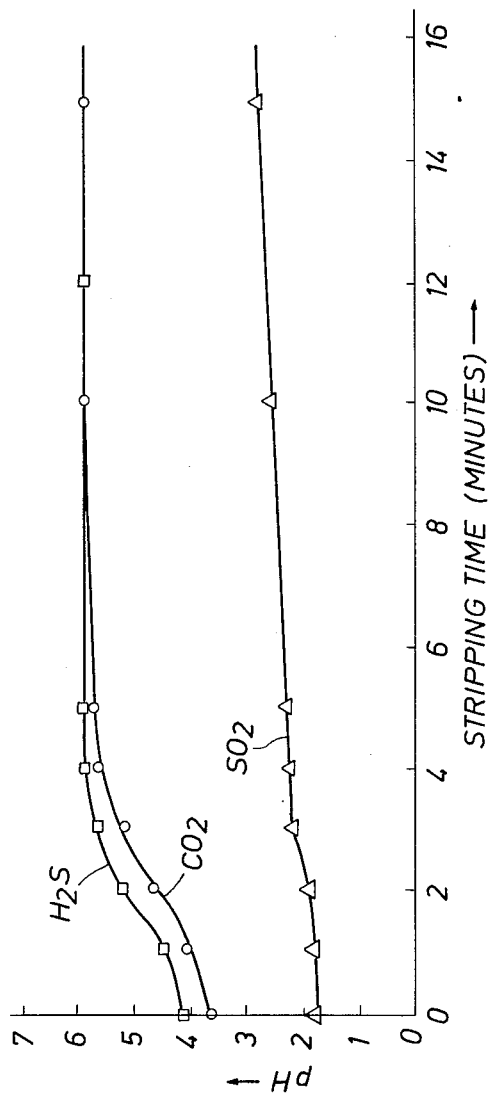
FIG. 1 is a graphic illustration of the relative rates at which $H_2S$, $CO_2$ and $SO_2$ are stripped from aqueous solution with an inert gas according to the invention (nitrogen).

In this specification Claus off-gases will be understood to mean the remaining gases in the state as obtained after the last processing step of a Claus plant. Conventional Claus processes use two catalyst beds or in some cases three or more beds depending on the degree of sulfur removal desired. In addition to hydrogen sulfide and sulfur dioxide, typically in a ratio of approximately 2:1, off-gases of this type also contain sulfur, water in the form of water vapor, carbon dioxide and slight quantities of carbon monoxide and hydrogen, as well as nitrogen and small quantities of inert gases if the Claus plant is operated with air. Depending on the manner in which the Claus process is operated and/or on the presence of hydrocarbons in the feed for the Claus process, the off-gases from the Claus plant may not only contain the above-mentioned compounds, but also carbonyl sulfide and/or carbon disulfide. The quantities of these compounds may vary from 0.1 to 0.4% by volume in the case of carbonyl sulfide and from 0.05 to 0.3% by volume in the case of carbon disulfide.

Claus off-gases normally have a temperature of between 130° C and 170° C upon discharge from the last catalyst bed and corresponding condenser. For the reduction step over the Group VI and/or Group VIII metal catalyst, the off-gases should, however, have a higher temperature and therefore are heated to a temperature above 175° C. The Claus off-gases are preferably brought to a temperature in the range of from 180° C to 480° C and more preferably between 200° C and 350° C.

This increase in temperature of the Claus off-gases may be achieved by external heating. It is preferred to heat the Claus off-gases to a temperature in excess of 175° C in a direct heating burner. In a burner of this type a fuel is burnt in a burner section and the resultant combustion gases are mixed with the Claus off-gases to be heated in a mixing section of the direct heating burner.

The Claus off-gases are mixed with a reducing gas which may be added before or after heating to a temperature of at least 175° C. When a direct heating burner is employed, the reducing gas is suitably supplied after the combustion of the fuel and before the mixing of the combustion gases with the Claus off-gases.

Reducing gas is understood to mean a gas which contains hydrogen and/or carbon monoxide, and which preferably contains both. Suitable reducing gases include town gas, water gas, synthesis gas, off-gas of a catalytic reforming unit, gas produced in a hydrogen plant or gas obtained from a working-up unit for saturated crude gases from petroleum. Pure hydrogen or carbon monoxide or mixtures thereof are also quite suitable in this application. Preferably the hydrogen-containing gas contains at least 5% by volume of $H_2$ or an equivalent amount of hydrogen and/or carbon monoxide. Mixtures of hydrogen and carbon monoxide which contain the said compounds in a volume ratio of 10:1 to 1:9 have been found to be particularly suitable. When using mixtures of hydrogen and carbon monoxide, higher space velocities can be used for the same degree of conversion of the reducing agent than when using hydrogen per se. This is due to the fact that in the presence of carbon monoxide the reaction rate for the reduction of the sulfur compounds in the Claus off-gas increases. The hydrogen or the hydrogen-containing gas is used in such a quantity that the ratio between hydrogen and sulfur dioxide is between 3:1 and 15:1. This ratio is preferably between 3.5:1 and 8:1.

When use is made of direct heating burners for heating the Claus off-gases to the temperature required for the reduction, it is also possible for the reducing gas to be produced by this heater. For this purpose, preferably a light hydrocarbon (having no more than 6 carbon atoms), such as methane, propane, butane or mixtures thereof, is burnt with a substoichiometric amount of air or oxygen. However, it is also possible to use liquid hydrocarbons such as naphtha, kerosine and gas oil for burners of this type. In this case a combustion gas is formed which contains hydrogen and carbon monoxide. It is desirable to produce little or no soot in this partial combustion in order to avoid clogging of the catalyst bed. The soot production and/or the combustion temperature can be further controlled by injecting water, steam or a mixture thereof into the combustion chamber of the direct heating burner during the combustion. As described above, the resultant combustion gases are mixed with the Claus off-gases in a mixing section.

As has been explained above, problems arise when the amount of reducing gas is not sufficient to reduce all the sulfur compounds present in the Claus off-gases to $H_2S$, and at such a moment the amounts of reducing gas and the Claus off-gases which are mixed with each other are adjusted, or increased, according to the invention. In fact in cases of extreme upset- i.e., where the $SO_2$ content of the off-gases is sufficiently high that sufficient reducing gas may not be available to convert essentially all of the $SO_2$ to $H_2S$ — it is contemplated that according to this invention the off-gas flow to the off-gas treating process may even be cut off and/or diverted.

When a direct heating burner is used for the production of the reducing gas, the amount of reducing gas is controlled by either increasing the supply of the feed to the burner or decreasing the oxygen or air supply to the burner, or vice versa.

After heating to a temperature in excess of 175° C the Claus off-gases, together with the reducing gas, are passed over a sulfided Group VI/Group VIII metal catalyst in order to reduce the sulfide dioxide to hydrogen sulfide. At the same time elemental sulfur is converted to hydrogen sulfide. The reduction catalysts used may be catalysts containing molybdenum, tungsten and/or chromium as Group VI metal, and preferably a metal from the iron group, such as cobalt, nickel and/or iron as Group VIII metal. The inorganic oxidic carrier may be alumina, silica, magnesia, boria, thoria, zirconia or a mixture of two or more of these compounds. Alumina is preferred. Particularly preferred reduction catalysts for use in the process according to the invention are a $Ni/Mo/Al_2O_3$ or a $Co/Mo/Al_2O_3$ catalyst.

The treatment of the off-gases with a hydrogen- and/or carbon monoxide-containing gas is preferably effected at a temperature in the range of from 180° C to 600° C, and more preferably between 200° C and 500° C. Although the pressure used is mainly atmospheric, slightly elevated pressures may also be used, if desired. The space velocity used during the reduction is from 500 to 10,000 Nl of Claus off-gases per liter of catalyst per hour.

After the Claus off-gases have been passed, in the presence of a reducing gas, over the sulfided Group VI/Group VIII metal catalyst supported on an inorganic oxidic carrier, they are cooled. Although it is possible to carry out the entire cooling by direct contact with a cooling liquid consisting substantially or completely of water, it is preferred to carry out the cooling in two stages, external cooling being used in the first stage. During such external cooling (also called indirect cooling), water is very suitably used as coolant, which may be converted during the cooling into low-pressure steam. Cooling in the first cooling stage is preferably carried out to a temperature of approximately 140° – 180° C.

In the second cooling stage, the gases are subsequently cooled by direct contact with a cooling liquid consisting substantially or completely of water, preferably to a temperature below 70° C. Water present in the gases is condensed and mixes with the cooling liquid. Suitably, this direct cooling stage is carried out in a cooling column or tower where circulating water countercurrently contacts the reduced off-gas stream under conditions at which the water present in the reduced off-gas stream is condensed with the cooled gaseous stream passing out the top of the column and the liquid phase flowing out near or at the bottom of the column. The column can suitably contain a conventional packing material, spray nozzles or contact trays to maximize its contact and cooling efficiency. On passage out of the bottom of the column the aqueous phase containing the condensate from the reduced off-gases is suitably passed through a filter (to remove any small amounts of elemental sulfur which may be present) and an indirect cooler prior to recirculation back into the direct cooling stage.

It is at this point in the process that the $SO_2$ detection procedure and appropriate process control according to the invention is incorporated into the processing scheme. On direct contact with the reduced off-gas stream under the conditions described, the aqueous based cooling liquid will absorb a significant quantity of $H_2S$ and $CO_2$ present in the reduced off-gas stream as well as a portion of the $SO_2$ which may be present due to process upsets and/or incomplete reduction in the catalytic reduction stage. The concentration of $CO_2$ and $H_2S$ in this aqueous based quench liquid will equilibrate depending on the temperature and pH of the quench liquid. Conventionally, in those direct cooling systems wherein the quench liquid is substantially recirculated, the concentrations of $CO_2$ and $H_2S$ consistently remain at or near the saturated concentrations for each component. At these concentrations of acidic $CO_2$ and $H_2S$ in the water based quench liquid, the pH of the liquid ranges generally between about 4 and 5, and more typically between 4.5 and 4.8. These low pH ranges are inherent in the process in the absence of $NH_3$ leak through from the Claus unit, a variable which is difficult to quantitatively control and hardly reliable enough to form a basis for process control. In cases of extreme upset and/or incomplete reduction of the Claus off-gases in the catalytic reduction step of the process, the amount of $SO_2$ which is carried through the reduction step and adsorbed in the water-based quench liquid may range as high as 20% based on total solution weight. The problem lies in the fact that at even these high $SO_2$ concentrations, much less the lower $SO_2$ concentrations more often encountered, the masking effect of the acidic $CO_2$ and $H_2S$ components coabsorbed in the quench water so decrease the sensitivity of pH to changes in $SO_2$ concentrations that pH cannot be considered a viable means of monitoring for $SO_2$ breakthrough from catalytic reduction. According to the invention it has been found that subjecting a portion of this quench water containing coabsorbed $CO_2$ and $H_2S$ to the stripping action of an inert gas affords a selective removal of both $CO_2$ and $H_2S$ from the quench water which is sufficiently rapid and complete, while leaving $SO_2$ behind, that the masking effect of these acidic components is substantially eliminated. With rapid and substantially complete removal of $CO_2$ and $H_2S$, pH measurement can be and is an accurate and reliable means of determining $SO_2$ breakthrough from the catalytic reduction step.

The inert gases which can be employed in the process of the invention include those non-acidic gases which are substantially nonoxidizing under the process conditions. Suitable inert gases include nitrogen, carbon monoxide, flue gas or any of the noble gases. For reasons relating to availability and cost the inert gas employed is preferably nitrogen. The inert gas stripping step is suitably carried out in any manner conventionally employed to rapidly pass fine bubbles of a gas through a liquid. For instance, the inert gas may be sparged into and passed upwardly through a discrete mass of the quench liquid contained, for example in a vertically oriented column. This vertical column may contain a plurality of contacting trays —e.g., value trays, bubble cap trays or perforated plates— to control the liquid residence time and intimacy of contact between the inert gas and the quench liquid. In any case the residence time of the quench liquid in the stripping step should be at least 2 minutes and preferably 3 or more minutes. The maximum residence time is not critical being dictated primarily by the limits of practical operation under the overall process conditions and the need to have a $SO_2$ determination which is reasonably responsive to changes in $SO_2$ concentration through the reduction step. Preferably this maximum residence time is no more than 10 minutes. The stripping temperature is suitably less than 70° C, i.e., the temperature of the quench liquid before or after indirect cooling. Under the stripping conditions described substantially complete removal of coabsorbed acidic $CO_2$ and $H_2S$ is possible such that the pH of the water-based quench liquid can be raised to a pH in the range of 5.5–6.5. At pH's in this range, pH can be utilized as a very sensitive means of detecting changes in the $SO_2$ concentration of the quench liquid. The phenomenon of rapid and complete removal of coabsorbed $CO_2$ and $H_2S$ relative to $SO_2$ on stripping with an inert gas is illustrated by FIG. I. In this figure the relative rates of removal for $CO_2$, $H_2S$ and $SO_2$, characterized by the change in pH while stripping solutions which were equilibrated with 5% $H_2S$ in $N_2$, 5% $SO_2$ in $N_2$, or 100% $CO_2$ are shown in terms of stripping time with nitrogen. As can be seen from this figure substantially complete removal of both $CO_2$ and $H_2S$ is obtained in about 2 minutes whereas the $SO_2$ concentration remains reasonably stable over the entire stripping period (16 minutes).

After removal of the coabsorbed $CO_2$ and $H_2S$ by stripping with an inert gas the $SO_2$ concentration or changes in $SO_2$ concentration is measured by means of pH. This pH measurement is then utilized to control the supply of reducing gas and/or Claus off-gases to the catalytic reduction step of the process. As a rule the controller for the supply valve of the reducing gas will be set at a minimum value because the presence of sulfur dioxide in the gases after the reduction stage is undesirable. A large excess of hydrogen or reducing gas is only undesirable for economic reasons, but a certain excess should be present after the reduction stage, in order to ensure at least that all sulfur compounds other than hydrogen sulfide have been reduced. The measuring signal may also be used to control the production of reducing gas when this is effected in the direct heating burner by means of partial combustion of light hydrocarbons as described above. To this end the measuring signal is passed to a controller which operates the supply valve of the feed and/or the oxygen or oxygen-containing gas to the burner, and compared therein with a set value.

Within the context of the overall process of the invention, the improved $SO_2$ detection procedure and accompanying process control is suitably incorporated into the process by withdrawing a portion of the aqueous based quench liquid emanating from the direct quench cooling step, either before or after indirect cooling of said stream, subjecting this separated portion of quench liquid to stripping with an inert gas in a separate stripping zone and measuring the pH of the stripped liquid as a means of controlling reactant feed rates over the reduction catalyst. Preferably this detection and control procedure is carried out on a continuous basis by withdrawing a side stream of the water based quench liquid from the above-described cooling recirculation loop, stripping this side stream in a continuous stripping column and measuring the pH of the stripped liquid with a probe type pH device.

After direct cooling with the water based quench liquid, the treated off-gases from catalytic reduction are subsequently contacted with an absorbent or absorbent for the removal of hydrogen sulfide. Any conventional agents which chemically or physically bind the hydrogen sulfide can be used for this purpose. These agents may be subdivided into solid and liquid agents. If a liquid absorbent is employed, contacting is preferably effected at a temperature below 70° C and the water present after condensation is first removed from the off-gases.

A very suitable solid adsorbent is active carbon, either as such or impregnated with solutions of chemical compounds which themselves are capable of reacting with hydrogen sulfide. Other suitable solid adsorbents are the oxides of certain metals, such as alumina, iron oxide and zinc oxide. More frequently use is made however, of liquid absorbents. Well known absorbents of this type are aqueous solutions of alkanolamines, alkyl alkanolamines, morpholines, dimethyl formamide, amines, ammonia, alkali metal carbonates, combined or not combined with minor quantities of other compounds such as arsenic trioxide, selenic and/or telluric acid, potassium phosphate, sulfolane and the like. Use may also be made of solutions having an oxidizing nature, so that elemental sulfur is formed. These latter solutions generally consist of an absorbent for hydrogen sulfide containing a dissolved or suspended oxidant or catalyst. Suitable oxidants and/or catalysts are polythionates, iron oxide, thioaromatics, iron cyanide complexes, permanganates and dichromates.

The adsorbents/absorbents used are preferably regenerable. Any hydrogen sulfide-containing gas liberated during regeneration may be recycled, for example, to the Claus plant.

The liquid and regenerable absorbent used is preferably an aqueous solution (1–3 molar) of an amine or a substituted amine, such as polyalkanolamines or alkaline metal salts of dialkyl-substituted amino acids. A solution of diisopropanolamine is very suitable.

If active carbon is used as adsorbent, adsorption is preferably effected between 20° and 150° C and at hourly space velocities of 750–2,000 Nl gas per liter of active carbon per hour.

The off-gases which have been freed from sulfur compounds by the process of the invention and which now consist predominantly of carbon dioxide and nitrogen in addition to minor quantities of hydrogen and traces of hydrogen sulfide may be discharged into the atmosphere. If desired, these off-gases may first be incinerated in a conventional manner before being passed to a stack.

Figure 2:
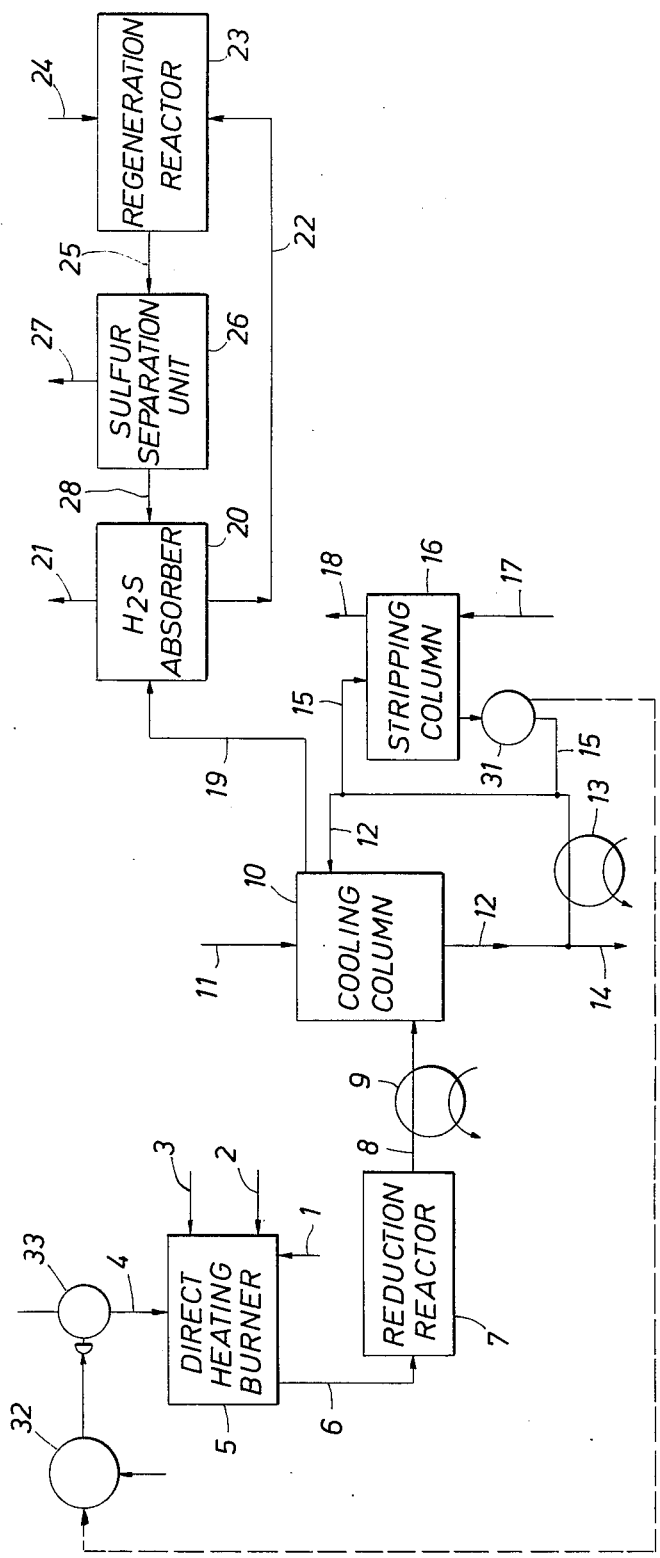
FIG. 2 is a schematic drawing which illustrates an embodiment of the process according to the invention.

One embodiment of the process is shown in FIG. 2. In this figure the Claus off-gases are passed through a supply line 1 to a direct heating burner 5. Fuel is passed to this burner 5 through a line 2 and an oxygen-containing gas through a line 3. Hydrogen-containing gas is introduced into the direct heating burner through a line 4. The Claus off-gases, which have a temperature of approximately 150° C, are heated in the direct heating burner to a temperature of 225° C and are subsequently passed through a line 6 over a reduction catalyst in a reactor 7. All the hydrogen-containing gas required is supplied through the line 4. The reduced gases leave the reactor 7 through a line 8 and are cooled in two stages, that is in a first stage in a heat exchanger 9 and in a second stage in a cooling column 10. In the cooling column 10 the gases flow countercurrently to the cooling water which is passed into the cooling column through a line 11. The cooling water and water formed by condensation of steam (hereinafter designated as quench water) which was present in the off-gases leave the cooling column through a line 12. The quench water is recycled via line 12 through a heat exchanger 13, back into the cooling column 10 with a small slip stream being taken at line 14 and sent to a conventional disposal means such as a sour water stripper to maintain water balance and minimize impurity build up in the recycle water. After passing through the heat exchanger 13, a side stream of the cooled quench water is taken off at line 15 and passed through a stripping column 16, wherein it is contacted with nitrogen gas introduced at line 17 for a time period sufficient to strip off substantially all of the absorbed $CO_2$ and $H_2S$ present in the quench water while leaving behind any $SO_2$ present in the quench water, the nitrogen and acid gas components being passed out of the stripping column via line 18 to disposal, preferably for recovery of the $H_2S$ contained therein, e.g., by recycle to the Claus unit or the quench column 10. The stripped quench water is then passed through a continuous pH monitoring device 31 (pH probe) and cycled via recycle line 15 back into the cooling water recycle line 12. The pH device or meter measures the amount or change in $SO_2$ concentration in the quench water and this signal is passed to a controller 32, the output signal of which adjusts a control valve 33 in the supply line of the hydrogen-containing gas 4. In this controller the input signal is compared with a set value. If the pH of the liquid in the line 15 is constant at the set value, the supply of hydrogen-containing gas is maintained at a preset amount. The gases leave the cooling column through a line 19 and are passed into an absorber 20 which contains an aqueous solution of sodium carbonate, sodium vanadate and sodium anthraquinone disulfonate. The non-absorbed gases leave the absorber 20 through a line 21. They contain such a small amount of sulfur compounds that they may be readily discharged into the atmosphere, optionally after combustion. $H_2S$ is absorbed in said aqueous solution which is passed through a line 22 into a regeneration reactor 23 into which oxygen-containing gas is supplied through a line 24. The contents of the reactor 23, which contains elemental sulfur, are discharged through a line 25 to a sulfur-separating unit 26 (e.g., a filter or a flotation unit), from which the elemental sulfur is discharged through a line 27. From the sulfur-separating unit 26 the aqueous solution is recycled to the absorber 20 through a line 28.

What is claimed is:

1. In a process for decreasing the total sulfur content of off-gases from a Claus process wherein the off-gases containing $SO_2$ and other convertible sulfur compounds are mixed with a reducing gas containing a gas selected from hydrogen, carbon monoxide, and mixtures thereof, and passed at a temperature in excess of about 175° C over a sulfided Group VI/Group VIII metal catalyst supported on an inorganic oxidic carrier to reduce the $SO_2$ and other convertible sulfur compounds to $H_2S$, followed by cooling of the $H_2S$-containing gaseous stream at least partially by direct cooling with a water-containing liquid quench stream and removal of the $H_2S$ from the cooled gaseous stream by contact with an absorbent or adsorbent for $H_2S$, in which process the flow of either or both of the $SO_2$ containing off-gases and the reducing gas over the metal catalyst is controlled by monitoring the $SO_2$ content of the reduced gas stream, the improvement which comprises carrying out of the monitoring of the $SO_2$ content of the catalytically reduced gas stream by stripping a portion of the water-containing liquid quench stream with an inert gas to remove $H_2S$ and $CO_2$ absorbed while cooling the $H_2S$ containing gaseous stream, and measuring the pH of the stripped quench liquid; and utilizing the measurement obtained to control the flow of either or both of the $SO_2$-containing off-gases and the reducing gas.

2. The process of claim 1, wherein the pH of the quench liquid prior to stripping with said inert gas is between 4.5 and 4.8 and the pH of said quench liquid after stripping is between 5.5 and 6.5.

3. The process of claim 1, wherein the inert stripping gas is nitrogen.

4. The process of claim 1, wherein the Claus off-gases are heated to a temperature in excess of 175° C in a direct heating burner to which a fuel and an oxygen-containing gas are supplied.

5. The process of claim 4, wherein the reducing gas is introduced into the direct heating burner after the combustion of the fuel and before the mixing of the combustion gases thereof with the Claus off-gases.

6. The process of claim 5, wherein the reducing gas is produced in the direct heating burner by substoichiometric combustion of the fuel.

7. The process of claim 1, wherein the $H_2S$-containing gaseous stream obtained after the reduction is cooled in two stages, indirect cooling being used in the first stage.

8. The process of claim 7, wherein the $H_2S$-containing gaseous stream is cooled to a temperature between 140° and 180° C in the first stage and to a temperature below 70° C in the second stage.

9. The process of claim 1, wherein after the direct cooling of the $H_2S$-containing gaseous stream, the $H_2S$ present in the gaseous stream is completely or substantially completely converted into sulfur by passing these cooled gases through a liquid and regenerable absorbent, regenerating the $H_2S$-enriched absorbent and supplying the $H_2S$-rich mixture liberated in the regeneration to a Claus plant.

10. The process of claim 9, wherein the liquid and regenerable absorbent is an aqueous solution of a compound selected from the group consisting of amines and substituted amines.

11. The process of claim 10, wherein the aqueous solution contains a polyalkanolamine.

12. The process of claim 11, wherein the polyalkanolamine is diisopropanolamine.

* * * * *